July 2, 1946. E. I. POLLARD 2,403,118
ARMATURE WINDING
Filed Feb. 20, 1943

WITNESSES:
Alice L. Howell
F. P. Lyle

INVENTOR
Ernest I. Pollard.
BY O. B. Buchanan
ATTORNEY

Patented July 2, 1946

2,403,118

UNITED STATES PATENT OFFICE 2,403,118

ARMATURE WINDING

Ernest I. Pollard, Wilkinsburg, Pa., assignor to Westinghouse Electric Corporation, East Pittsburgh, Pa., a corporation of Pennsylvania Application February 20, 1943, Serial No. 476,595

5 Claims. (Cl. 171—252)

The present invention relates to armature windings for dynamo-electric machines, and more particularly to an improved armature winding for high-frequency alternating-current generators of the inductor type.

Inductor type alternating-current generators are used to supply high-frequency current. Generators of this type have a slotted armature core carrying a suitable armature winding, and also have an exciting winding on the stator which provides a unidirectional magnetic field passing through the stator and rotor. The rotor of such a machine has no winding, but has teeth on its periphery, so that as the rotor rotates, the reluctance of the magnetic path through the armature conductors varies, and the resulting variation of the flux linking the conductors causes an alternating voltage to be induced in them.

The armature winding of an inductor type generator usually consists of a plurality of coils having a relatively large number of turns as compared to the armature coils of other types of generators, and the coils usually have a pitch of one slot, so that the two sides of a coil lie in, and completely fill, two adjacent slots of the armature core. The winding is connected with the individual coils, or with groups of coils, connected in parallel completely around the armature. In many machines of this type, the eddy-current losses in the armature conductors can be kept reasonably small by providing a large number of parallel paths for the armature current, and by using a large number of turns in the armature coils, so that the thickness of the armature conductors is small, resulting in reasonably low eddy-current loss in the conductors. In large, low-voltage inductor generators, however, even with all the individual armature coils connected in parallel, the number of parallel paths through the armature is not great enough to permit the use of a sufficiently large number of turns in each coil, and the eddy-current losses become undesirably high.

The principal object of the present invention is to provide an armature winding for large, low-voltage, high-frequency generators of the inductor type in which the eddy-current loss is very small.

A more specific object of the invention is to provide an armature winding for large, low-voltage, high-frequency generators of the inductor type in which the armature coils are wound from conductors which are divided into strands depthwise of the coil, and in which the strands of each coil are transposed, or reversed in position, at the electrical midpoint of the coil, so that the transposition is complete in each coil and the eddy-current losses are made very small.

Other objects and advantages of the invention will be apparent from the following detailed description, taken in connection with the accompanying drawing, in which.

Figure 1:
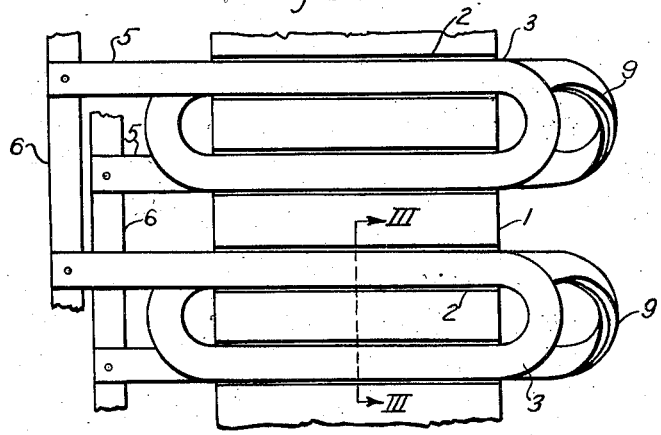
Figure 1 is a fragmentary, somewhat diagrammatic, plan view of a portion of the armature core of an inductor generator with the armature winding in place.
Figure 3:
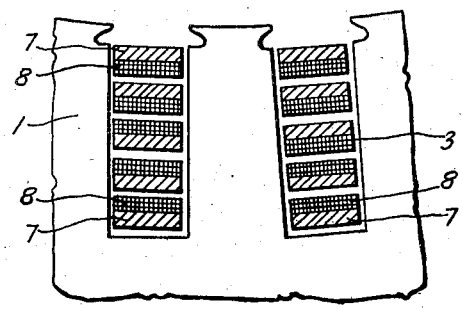
Fig. 3 is a fragmentary, diagrammatic, sectional view through two slots of the armature core showing the two sides of a single coil in place in the slots, the view being approximately on the line III—III of Fig. 1.

Fig. 1 shows a portion of the armature core 1 of an inductor generator with the armature winding in place. The core 1 is generally annular and of the usual laminated construction, and has a plurality of slots 2 in its inner periphery. The winding consists of a plurality of armature coils 3 which are placed in the slots 2 as shown in Figs. 1 and 3. Each coil 3 consists of a plurality of turns 4 of a suitable conductor, and is wound with a pitch of one slot, so that the two sides of the coil lie in adjacent slots of the armature core 1. The coil shown in the drawing for the purpose of illustration has five turns, but it will be understood that any suitable number of turns may be used, and that in an actual machine a larger number of turns will usually be desirable. The two ends of the conductor extend out of the coil to form leads 5, and all of the coils 3 are connected in parallel by suitable end connections 6 which extend around the armature.

Figure 2:
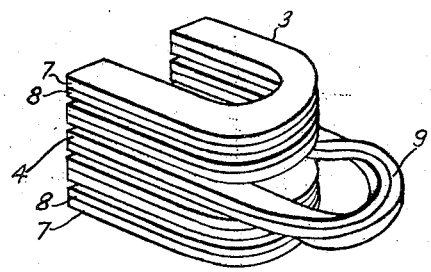
Fig. 2 is a perspective view of one end of a single armature coil.

As more clearly shown in Figs. 2 and 3, the conductor from which each coil is wound is divided depthwise of the coil into at least two strands 7 and 8, which are insulated from each other. The central turn of the coil is extended out of the coil beyond the other turns, as indicated at 9, at the electrical midpoint of the coil. In a coil having an odd number of turns, this extended portion 9 will be at the end of the coil opposite to the leads, as shown in the drawing, while in a coil having an even number of turns, the extended portion 9 will be at the same end of the coil as the leads. The two strands 7 and 8 of the conductor are transposed in the extended portion 9, so that they are reversed in position, as clearly shown in Fig. 2. This transposition may be effected simply by twisting the conductor so as to turn it over at the electrical midpoint of the coil, or it may be effected in any other suitable manner, as by breaking the conductor in the extended portion 9 and connecting the individual strands by means of jumpers or a clip of suitable construction to effect the desired transposition.

The effect of this transposition is illustrated in Fig. 3, in which the individual turns of a single coil 3 are shown in position in two adjacent slots 2 of the armature core. In this figure, the strand 7 is shown single-hatched and the strand 8 cross-hatched so that their relative positions in the separate turns can be clearly seen, and it will be apparent from this figure that the relative position of the two strands in one-half of the coil is reversed with respect to their relative position in the other half, so that the transposition is complete within the coil. The individual strands 7 and 8 are, of course, insulated from each other in the usual manner, and if desired the conductors may also be divided into insulated strands transversely of the slots in order to still further reduce the eddy-current losses. The individual turns of the coil are insulated from each other, and the coil as a whole is insulated before placing it in the slots. This insulation has not been shown in the drawing, since any suitable or usual type of insulation may be used, and the manner of insulating the coil is not a part of the invention.

It should now be apparent that an armature winding for inductor type generators has been provided in which the eddy-current losses can be made very low. This results from the use of a conductor which is stranded depthwise of the coil and transposed at the electrical midpoint of the coil. The transposition is, therefore, complete within each coil and gives the effect, so far as the eddy-currents are concerned, of multiplying the number of turns in the coil by the number of strands into which the conductor is divided.

It will be apparent that various modifications may be made without departing from the spirit of the invention. Thus, more than two strands might be used, if necessary or desirable, and the transposition can be effected in the extended central turn either by twisting or turning over the conductor, or by the use of clips or jumpers, or in any other suitable manner. It is to be understood, therefore, that although a specific embodiment of the invention has been shown and described for the purpose of illustration, it is not limited to the exact construction shown, but in its broadest aspects the invention includes all equivalent modifications and embodiments which come within the scope of the appended claims.

I claim as my invention:

1. In an alternating-current generator of the inductor type having a slotted armature core, a plurality of armature coils disposed in the slots of the armature core, each of said coils comprising a plurality of turns of a continuous, stranded conductor with the sides of the coil lying in adjacent slots of the core, said conductor being divided into strands depthwise of the coil, a portion of the conductor at the electrical midpoint of the coil being extended out of the coil, and the strands being transposed in said extended portion.

2. In an alternating-current generator of the inductor type having a slotted armature core, a plurality of armature coils disposed in the slots of the armature core, each of said coils comprising a plurality of turns of a continuous, stranded conductor with the sides of the coil lying in adjacent slots of the core, said conductor being divided into strands depthwise of the coil, one end of the central turn of the coil being extended beyond the other turns at the electrical midpoint of the coil, and means in said extended turn for reversing the relative position of the strands.

3. An armature coil for a dynamo-electric machine having a slotted armature core, said coil comprising a plurality of turns of a continuous, stranded conductor, the conductor being divided into strands depthwise of the coil, the central turn of the coil being extended beyond the other turns at the electrical midpoint of the coil, and means in the extended portion of said turn for transposing the strands.

4. In an alternating-current generator of the inductor type having a slotted armature core, a plurality of armature coils disposed in the slots of the armature core, each of said coils comprising a plurality of turns of a single, continuous, stranded conductor with the sides of the coil lying in adjacent slots of the core, said conductor being divided into strands depthwise of the coil, the central turn of the coil having one end thereof at the electrical midpoint of the coil extended beyond the other turns, and the conductor being turned over in said extended end of the central turn to reverse the relative positions of the strands.

5. An armature coil for a dynamo-electric machine having a slotted armature core, said coil comprising a plurality of turns of a single, continuous, stranded conductor, said conductor being divided into strands depthwise of the coil, a portion of the central turn of the coil being extended beyond the other turns at the electrical midpoint of the coil, and the conductor being turned over in said extended portion to reverse the relative positions of the strands.

ERNEST I. POLLARD.